US008812757B2

(12) United States Patent
Chen et al.

(10) Patent No.: US 8,812,757 B2
(45) Date of Patent: Aug. 19, 2014

(54) ONLINE CALIBRATION METHOD AND DEVICE FOR UNIVERSAL SERIAL BUS SYSTEM

(75) Inventors: Cheng-Yu Chen, Tai Nan (TW); Chih Ching Chien, Hsin Chu County (TW); Dong Zhou, Su Chou Industrial Park (CN)

(73) Assignee: Realtek Semiconductor Corp., Hsinchu (TW)

( * ) Notice: Subject to any disclaimer, the term of this patent is extended or adjusted under 35 U.S.C. 154(b) by 166 days.

(21) Appl. No.: 13/312,163

(22) Filed: Dec. 6, 2011

(65) Prior Publication Data
US 2012/0144088 A1  Jun. 7, 2012

(30) Foreign Application Priority Data

Dec. 7, 2010  (CN) .......................... 2010 1 0577500

(51) Int. Cl.
G06F 3/00 (2006.01)
G06F 5/00 (2006.01)
G06F 13/42 (2006.01)
(52) U.S. Cl.
CPC .................................. G06F 13/4269 (2013.01)
USPC ................. 710/104; 710/15; 710/16; 710/58; 710/8
(58) Field of Classification Search
None
See application file for complete search history.

(56) References Cited

U.S. PATENT DOCUMENTS

| 6,940,303 | B2 * | 9/2005 | Vargas ............................. 326/30 |
| 8,190,381 | B2 * | 5/2012 | Spanier et al. .................. 702/60 |
| 2007/0118322 | A1 | 5/2007 | Tan et al. |
| 2009/0251192 | A1 * | 10/2009 | Ong et al. ..................... 327/331 |

FOREIGN PATENT DOCUMENTS

| JP | 2003-122465 | 4/2003 |
| JP | 2008-182516 | 8/2008 |
| TW | 200717226 | 5/2007 |
| WO | WO-2004061636 A1 | 7/2004 |

OTHER PUBLICATIONS

Tjia, Jerome, High-Speed Detection Handshake Considerations, Philips Semiconductors, May 9, 2011, pp. 1-20.

* cited by examiner

*Primary Examiner* — Ernest Unelus
*Assistant Examiner* — Ronald Modo
(74) *Attorney, Agent, or Firm* — McClure, Qualey & Rodack, LLP (57) ABSTRACT

An online calibration method and device for a universal serial bus system is disclosed in the present invention. The method comprises following steps: providing a plurality of chirp JK pairs; detecting the plurality of chirp JK pairs, and loading a power on a terminal resistor of a USB device end of the universal serial bus and its coupled to a terminal resistor of a USB host end of the universal serial bus; detecting a voltage level variation of the chirp JK pair; and processing the online calibration according to the voltage level variation to maintain the voltage level within a preset range.

10 Claims, 11 Drawing Sheets

ONLINE CALIBRATION METHOD AND DEVICE FOR UNIVERSAL SERIAL BUS SYSTEM

BACKGROUND OF THE INVENTION (a) Field of the Invention

The invention relates to a universal serial bus device, particularly to an online calibration method and device for a universal serial bus system.

(b) Description of the Related Art

Since the use of universal serial bus becomes popular, various products used as universal serial bus host ends (hereinafter referred to as "USB host end") and universal serial bus device ends (hereinafter referred to as "USB device end") are derived. In order to communicate the USB host end and the USB device end, the signal compatibility between the USB host end and the USB device end should be taken into account. A USB device, such as a USB host end or a USB device end, includes a transceiver. The transceiver is used to receive and transmit data between the USB host end and the USB device end and to detect signal of both.

Further during high-speed operation of a USB device with USB 2.0 specification, the USB device transmits signals by a current driving method so that the termination impedance in the transceiver has to be within a tolerable range complied with USB 2.0 specification. Thus the correctness of received signals of the transceiver, and the signal compatibility between the USB host end and the USB device end can be assured.

Deviation often occurs in semiconductor processes. A USB device couples to another USB device where the equivalent termination impedance is referred to any side of a transceiver in the USB device and usually has deviation that exceeds a tolerable range according to the design specification. Therefore, in order to improve a connection compatibility of a USB device with other USB devices, such deviation should be corrected.

A common calibration method is a self-calibration method. Such a method is to use a reference voltage source or current source in a USB device to slightly adjust deviation occurred by a USB device itself to achieve deviation within a designed tolerable range.

However, handshaking of USB devices with USB 2.0 specification during building connection is a process of participation of a USB host end and a USB device end. Since a USB host end and a USB device end are combined together, whole deviation contributed by both ends can not be covered by the separate self-calibration of termination impedance. The compatibility problem during connection may occur or even the functionality of the product may fail. Moreover, the product cannot be correctly connected.

BRIEF SUMMARY OF THE INVENTION

One object of the invention is to provide an online calibration method for a universal serial bus device or system and a device having the online calibration function to simultaneously take the characteristics of termination impedance of the USB host end and the USB device end into account.

One object of the invention is to provide an online calibration method for a universal serial bus device or system and a device having the online calibration function to increase compatibility between USB devices.

One embodiment of the invention provides an online calibration method for a universal serial bus system. The universal serial bus system includes a USB host end and a USB device end. The method comprises the following steps. At first, a plurality of chirp JK pairs are provided. The plurality of chirp JK pairs are detected and, before a preset chirp JK pair is outputted, a power is loaded on a terminal resistor of the USB device end and is coupled to a terminal resistor of the USB host end so as to change the voltage level of the chirp JK pair. A voltage level variation of the changed chirp JK pair is detected on a node. According to the voltage level variation, online calibration is processed to maintain the voltage level of the changed chirp JK pair within a preset range.

Another embodiment of the invention provides an online calibration method for a universal serial bus device when coupled to another universal serial bus device. The method comprises the following steps. At first, during a first period of time, a power is loaded on two terminal resistors included in the two universal serial bus devices to lower a voltage level of a chirp JK pair and apply a voltage level on a node between the two terminal resistors. During a second period of time, the voltage level is compared with a reference voltage and the resistance values of the two terminal resistors or one of the two terminal resistors is adjusted to maintain the lowered voltage level of the chirp JK pair within a preset range. The second period of time is after the first period of time and the first period of time is after the universal serial bus accomplishes declaration of high speed capability.

One other embodiment of the invention provides a universal serial bus device, for connecting to another universal serial bus device and processing online calibration. The universal serial bus device comprises a power source, a terminal resistor, and a calibration circuit. The calibration circuit comprises a first switch circuit, a second switch circuit, a comparator, and a regulator. The first switch circuit is coupled between the power source and the terminal resistor to provide the power source to the terminal resistor through a node. The second switch circuit provides a reference voltage. The comparator comprises a first input end coupled to the reference voltage, a second input end coupled to the node, and an output end to output a comparison result. The regulator is coupled to the output end of the comparator and adjusts a resistance value of the terminal resistor. The first switch circuit is turned on during a first period of time to load the power source on the terminal resistor so as to lower a voltage level of a chirp JK pair and apply a voltage level on the node. The second switch circuit provides the reference voltage during a second period of time. The calibration circuit compares the voltage level on the node with the reference voltage to generate the comparison result. The regulator adjusts the resistance value of the terminal resistor according to the comparison result to maintain the lowered voltage level of the chirp JK pair within a preset range. The second period of time is after the first period of time; and the first period of time is after the universal serial bus accomplishes declaration of high speed capability.

The online calibration method and the device or system having online calibration according to the present invention, after the terminal resistors of the USB host end and the device are coupled, compare the chirp JK pairs and the voltage on the node generated by coupling the two terminal resistors of the two ends with a reference voltage to adjust the termination impedance to have the node voltage substantially be equal to the reference voltage so as to reduce the probability of connection error, speed reduction, disconnection of the USB device and to achieve the purpose of increasing compatibility between USB devices.

Other objects and advantages of the invention can be better understood from the technical characteristics disclosed by the invention. In order to clarify the above mentioned and other objects and advantages of the invention, examples accompanying with figures are provided and described in details in the following.

DETAILED DESCRIPTION OF THE INVENTION

Figure 1A:
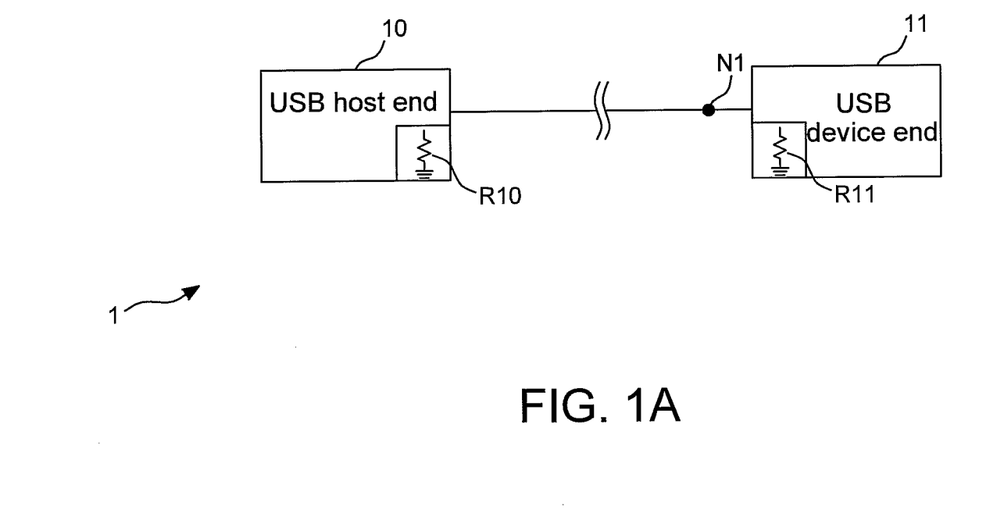
FIG. 1A shows a schematic diagram illustrating a universal serial bus system according to one embodiment of the invention.

FIG. 1A shows a schematic diagram illustrating a universal serial bus system 1 according to one embodiment of the invention. The universal serial bus system 1 (hereinafter referred to as "USB system") comprises two universal serial bus devices (hereinafter referred to as "USB device") and the two USB devices are connected through a USB bus. As shown in the figure, the two USB devices are a USB host end 10 and a USB device end 11, respectively.

Figure 1B:
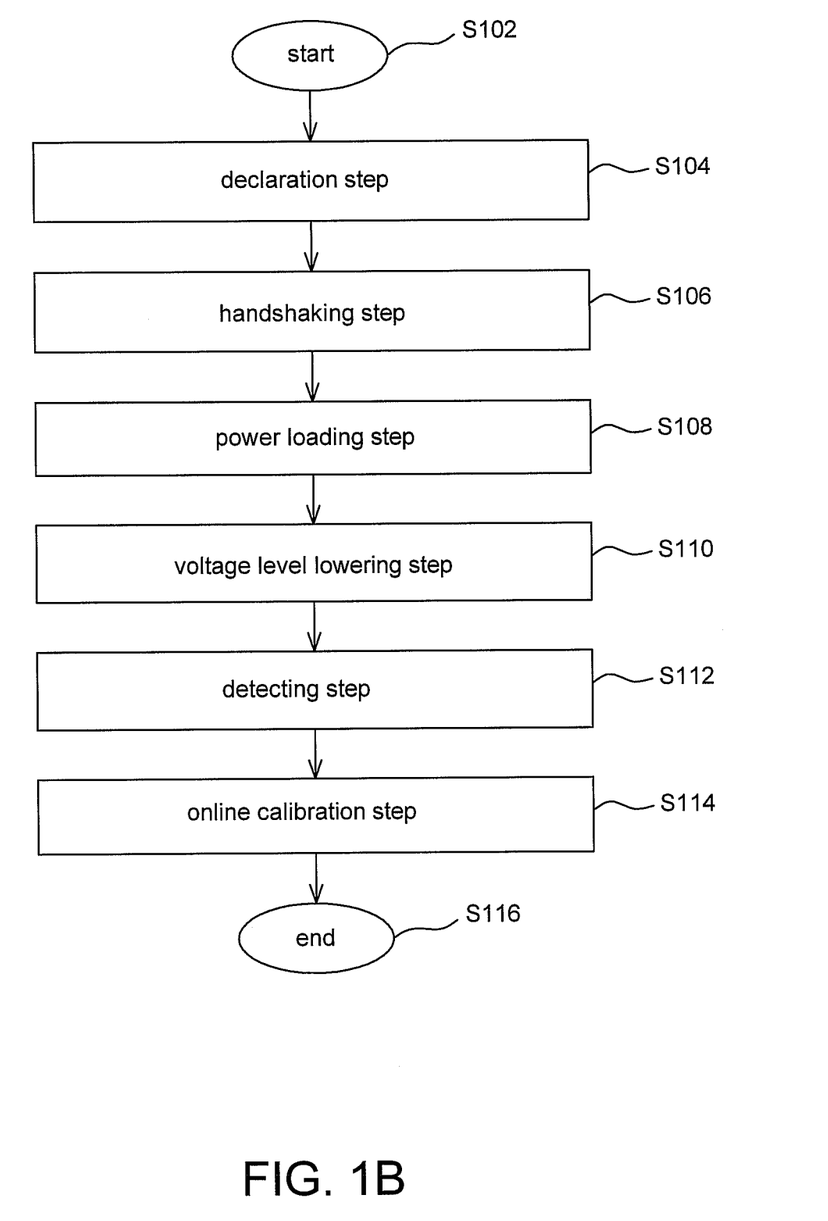
FIG. 1B shows a flow chart illustrating an online calibration method according to one embodiment of the invention.
Figure 1C:
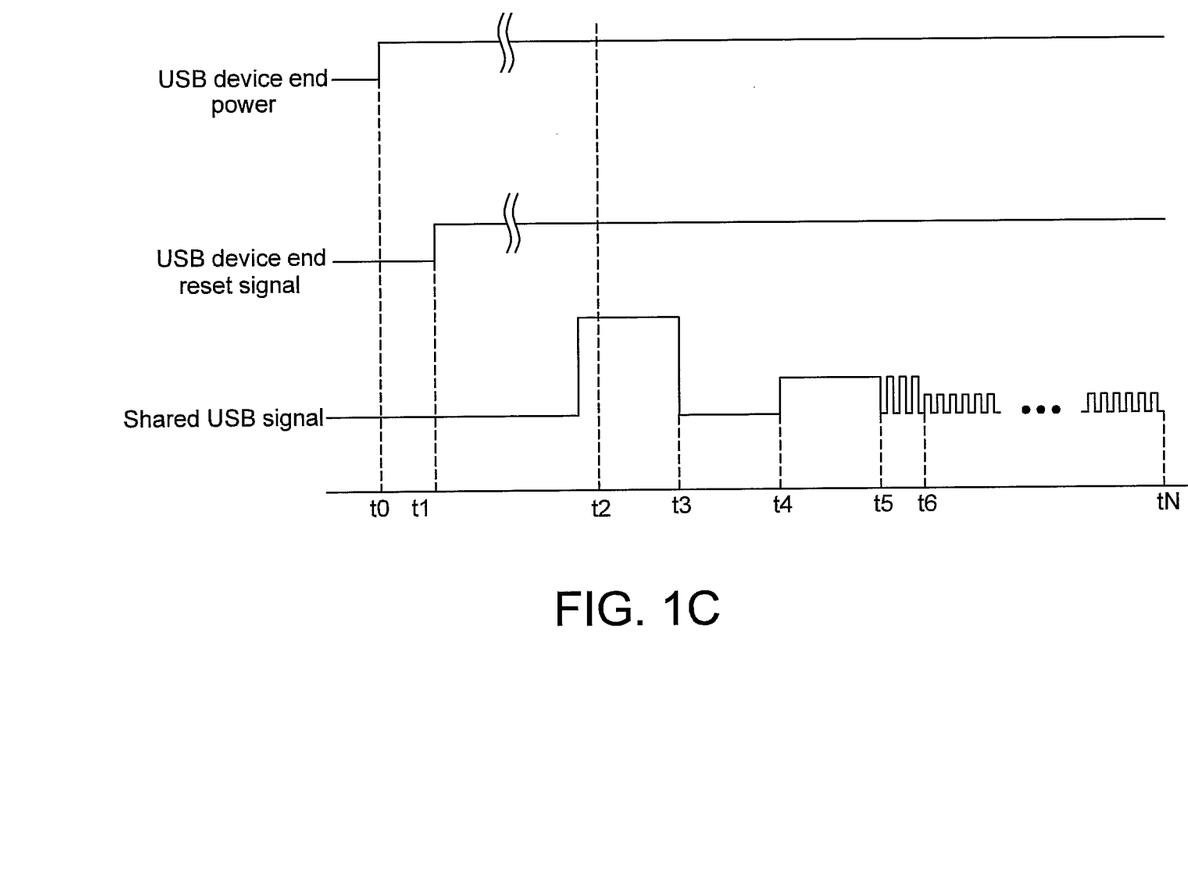
FIG. 1C shows a schematic diagram illustrating the waveforms of an online calibration method for a universal serial bus device or system according to one embodiment of the invention.

FIG. 1B shows a flow chart illustrating an online calibration method for a USB device according to one embodiment of the invention. FIG. 1C shows signal waveforms of connection of the USB host end 10 and the USB device end 11 shown in FIG. 1A.

Please refer to FIG. 1B accompanying with FIGS. 1A and 1C. The calibration method of connection of the USB host end 10 and the USB device end 11 will be described in the following. The method comprises the following steps.

Step S102: start. Please refer to FIG. 1C. The step comprises initialization of the USB devices during the period of t0~t4. At the time t0, the USB device end 11 is coupled to the USB host end 10 through a bus and the terminal resistor R11 of the high speed transceiver of the USB device end 11 is coupled to the terminal resistor R10 of the high speed transceiver of the USB host end 10 to form a node but no signal (voltage or current) is loaded on the two terminal resistors where the power of the USB device end 11 is turned on and maintained at a high level. During the period of t0~t1, the reset signal of the USB device end is at low and the USB device end is reset and, after that, the reset signal of the USB device end is back to high. During the period of t1~t2, the USB device end 11 and the USB host end 10 separately process conventional self-calibration where the completion time t2 of self-calibration is earlier than the time t3. The shared USB signal is switched to high after reset of the USB device end to notify the USB host end 10 that the USB device end 11 is connected to a port. At the time t3, the USB host end 10 recognizes the connection of the USB device end 11 and processes reset to have the USB signal become low. Then, it is preceded to the time t4, that is, step S104.

Step S104: declaration step, during the period of t4~t5, the USB device end 11 provides a high speed declaration signal through the bus to declare that the USB device end 11 is capable of high speed communication complying with high speed USB specification.

Step S106: handshaking step, starting from the time t5, the USB host end 10 and the USB device end 11 start handshaking and the USB host end 10 outputs a plurality of continuous chirp JK pairs.

Step S108: power loading step, the USB device end 11 detects these chirp JK pairs and, before a preset chirp JK pair is outputted, such as before the chirp-K of the third chirp JK pair shown at the time t6 is outputted, the USB device end 11 loads a power on its terminal resistor to generate a corresponding electric signal on the node formed by connection of the two terminal resistors.

Step S110: voltage level lowering step, after the terminal resistor is loaded with the power in the USB device end, the voltage level of the chirp JK pair is lowered, as shown at the time t6, to be recognized by the USB host end. According to the specification, the USB host end 10 determines the link to be normal operation, low-speed operation, or interrupted according to whether the lowered voltage level is within a preset range or not.

Step S112: detecting step, after the time t6, the chirp JK pair JK having a changed voltage level (changed chirp JK pair) is detected.

Step S114: online calibration step, before the time tN, according to the changed chirp JK pair JK, online calibration is processed to maintain the voltage level of the changed chirp JK pair JK within the preset range.

Step S116: end. At the time tN, according to the specification, the USB host end 10 accomplishes handshaking with and recognition of the USB device end 11 and the USB host end 10 start communication to perform data transmission.

According to the above mentioned method, the USB system according to the invention, besides self-calibration, takes both the characteristics of the USB host end 10 and the USB device end 11 simultaneously into account. For example, the two terminal resistors of the two ends are both taken into account to cover the whole deviation contributed by the two to process precise impedance calibration and adjustment to correctly reflect the signal status on the bus so as to increase the compatibility of the USB product and solve the problem in the prior art. The USB system according to the invention can be built in the USB host end 10 or in the USB device end 11.

Figure 2A:
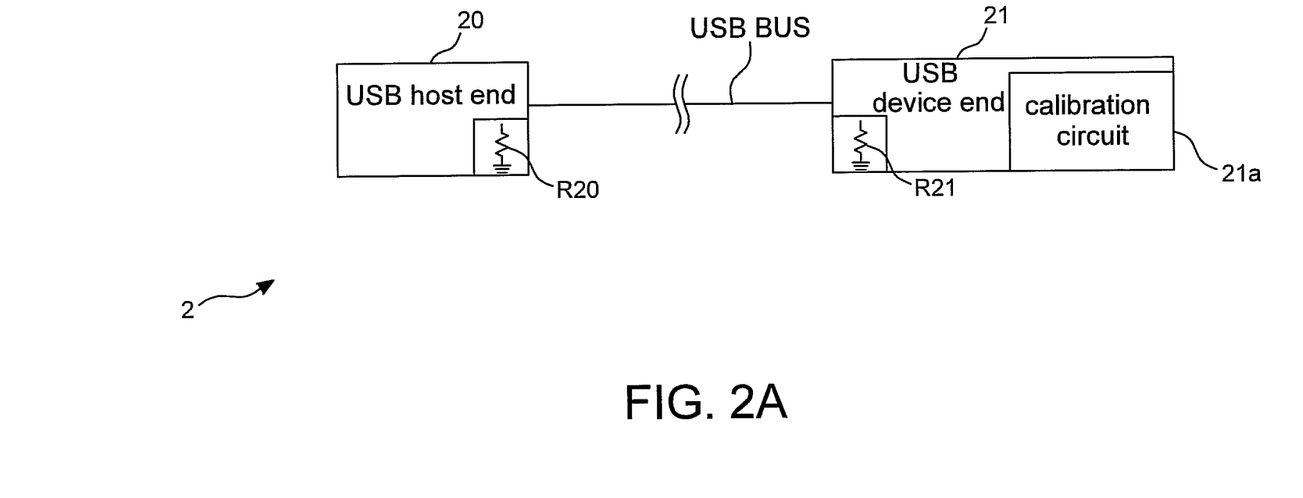
FIG. 2A shows a schematic diagram illustrating a universal serial bus system according to one embodiment of the invention.

The online calibration provided by the invention can be processed from a USB host end or a USB device end. FIG. 2A shows a schematic diagram illustrating a USB system 2 according to another embodiment of the invention. The USB system 2 comprises a USB host end 20 and a USB device end 21. In this embodiment, the calibration circuit 21a is provided at the USB device end 21. Referring to the flow chart of FIG. 1B, after the USB host end 20 and the USB device end 21 are connected, high speed handshaking is processed. As shown in FIG. 1C, the USB host end 20 outputs a preset chirp JK pair until the two ends start data transmission. That is, during the period of time t6~tN, the terminal resistor R20 of the USB host end 20 and the terminal resistor R21 of the USB device end 21 are loaded with the power source (current source) of the USB device end 21 and the calibration circuit 21a detects the chirp JK pair after the voltage level is changed to process online calibration.

Figure 2B:
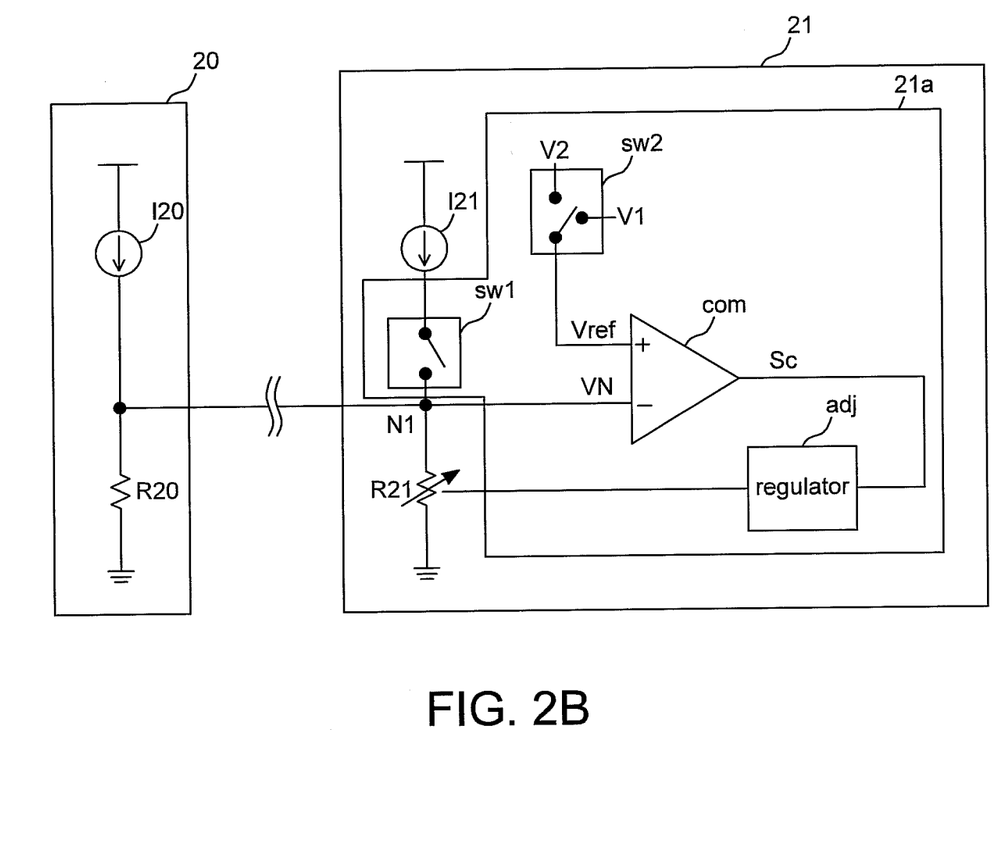
FIG. 2B shows a schematic diagram illustrating a part of circuitry of a universal serial bus device and the calibration circuit according to one embodiment of the invention.

FIG. 2B shows a schematic diagram illustrating one example of the calibration circuit 21a according to one embodiment of the invention. In this embodiment, the USB host end 20 is represented by the power source I20 of the USB host end and a terminal resistor R20. The USB device end 21 comprises a power source I21 of the USB device end, a terminal resistor R21, and the calibration circuit 21a. The calibration circuit 21a comprises a switch sw1, a switch sw2, a comparator com, a regulator adj. One end of the switch sw1 is coupled to the power source I21 and the other end is coupled to the first terminal resistor R21 to form a node N1. One end of the switch sw2 is coupled to an input end of the comparator com and the other end of the switch sw2 is switched between the self-calibration voltage V1 and the online calibration voltage V2. The comparator com comprises two input ends, one of which is coupled to the switch sw2 and the other one of which is coupled to the node N1. The regulator adj is coupled to the output end of the comparator com.

The following describes the operation method of FIG. 2B with reference to FIGS. 1B and 1C.

During the period of t0~t2, the USB host end 20 and the USB device end 21 are coupled to each other through a USB bus but the terminal resistors R20 and R21 have not been loaded with the power of the USB device end 21 yet. At the time, the two ends separately process their own self-calibration of the terminal resistor. Taking the USB device end 21 as an example, during this period, the switch sw1 is turned on and the switch sw2 is switched to the self-calibration voltage V1 so that the comparator com compares the voltage on the node N1 with the self-calibration voltage V1. At the time, the voltage on the node N1 is $$VN = I21 * R21. \tag{1}$$

The comparator com compares the node voltage VN with the self-calibration voltage V1 to generate a comparison signal Sc. The regulator adj receives the comparison signal Sc and adjusts the resistance of the terminal resistor R21 according to the comparison signal Sc until the node voltage VN is substantially equal to the self-calibration voltage V1 to accomplish self-calibration. In one embodiment, assuming the two terminal resistors R20=R21=45 ohm, the two current sources I1=I2=17.78 mA, and the self-calibration voltage V1=800 mV, the node voltage VN of the node N1 of the USB device end 21 is about 800 mV. Due to process or environmental influences, the value of the node voltage VN may be deviated from 800 mV and then the voltage variation from 800 mV, during the self-calibration process of the USB device end 21, is adjusted to be substantially equal to 800 mV.

After the self-calibration is accomplished, after steps S102.about.S106, the USB host end 20 recognizes the USB device end 21 complying with high speed USB specification and the USB host end 20 at the time t5 starts to continuously output a plurality of chirp JK pairs. At the step S108 (time t6), before the preset chirp JK pair is outputted (where the present chirp JK pair may comprise, for example, the third chirp JK pair), the switch sw1 is turned on, the switch sw2 is switched to the online calibration voltage V2, and the terminal resistors R20 and R21 of the USB host end 20 and the USB device end 21 are loaded with the power source I21 of the USB device end 21. Therefore, in the step S110, the voltage level of the chirp JK pair is lowered. Then, the step S112 proceeds. During the time the voltage level of the chirp JK pair is lowered before the USB host end 20 accomplishes recognition to start communication, that is, the period of t6~tN, since the switch sw1 is turned on and the switch sw2 is switched to the online calibration voltage V2, the comparator coin compares the online calibration voltage V2 with the node voltage VN on the node N1 of the USB device end 21 formed by the chirp JK pair. At the time, the node voltage VN is $$VN = I21 * \frac{R20 * R21}{R20 + R21}. \tag{2}$$

The comparator com compares the node voltage VN with the online calibration voltage V2 and generates a comparison signal Sc according to the comparison result. The regulator adj adjusts the resistance of the terminal resistor R21 according to the comparison signal Sc until the node voltage VN is substantially equal to the online calibration voltage V2. In one embodiment, the two terminal resistors are R20=R21=45 ohm, the two current sources are I1=I2=17.78 mA, and the online calibration voltage is V2=800 mV. At the time, the two terminal resistors are coupled together and thus the load of the USB device end 20 is R20 and R21 connected in parallel, about 22.5 ohm. Thus, the node voltage VN of the node N1 of the USB device end 21 is about 400 mV. Due to process or environmental influences, the value of the node voltage VN may be deviated from 400 mV. At the time, the comparator com compares the node voltage VN with the online calibration voltage V2 to generate an appropriate comparison signal Sc for the regulator adj to adjust the terminal resistor R21 to have the voltage variation from 400 mV be adjusted to be substantially equal to 400 mV.

The duration of each chirp JK pair is about 50 microseconds while the time length of the whole chirp JK pair (t6~4N) is about few tens of milliseconds. Thus, the calibration circuit 21a of the USB device end 21 has enough time to process the calibration of the terminal resistor to achieve the effect of calibrating the two terminal resistors of the USB host end 20 and the USB device end 21.

In one embodiment, the comparison signal Sc comprises the up counting signal (Up) and down counting signal (Dn) and the regulator adj can be a counter. According to the up counting signal or the down counting signal, the terminal resistor R21 is adjusted through a digital means.

Figure 2C:
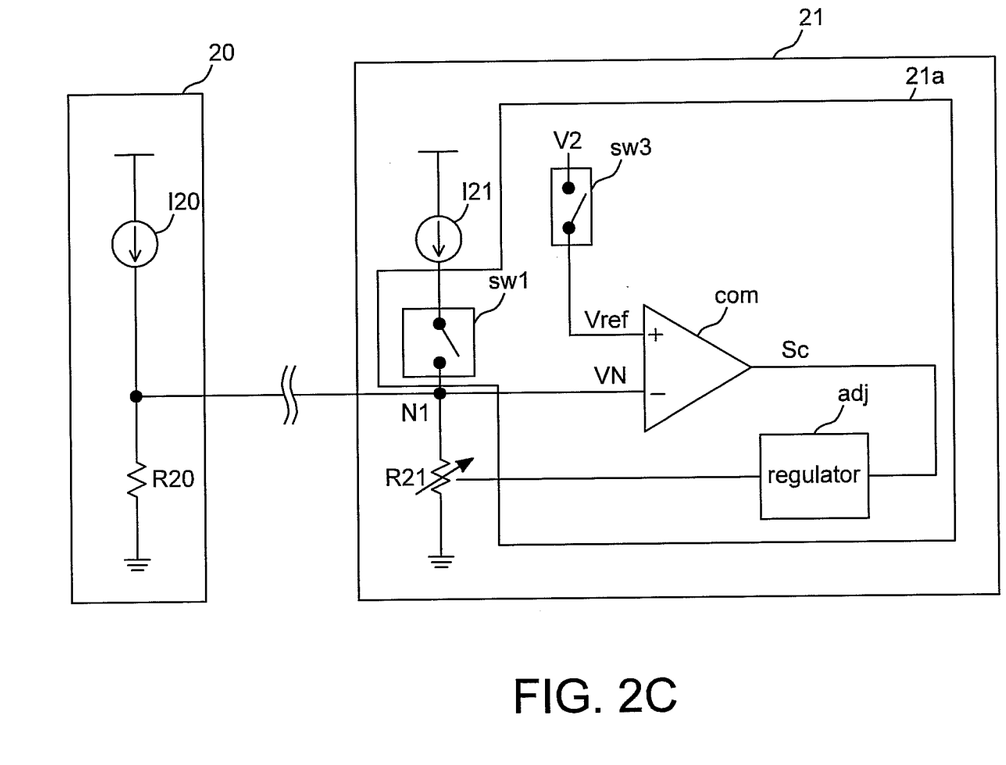
FIG. 2C shows a schematic diagram illustrating a part of circuitry of a universal serial bus device and the calibration circuit according to one embodiment of the invention.

As shown in FIG. 2C, the calibration circuit 21a can use a switch sw3 to provide only the online calibration voltage V2 but not self-calibration voltage V1. In other words, the conventional self-calibration can be omitted and only the online calibration is processed after the preset chirp JK pair (chirp-K of the third chirp JK pair) is outputted.

Figure 3A:
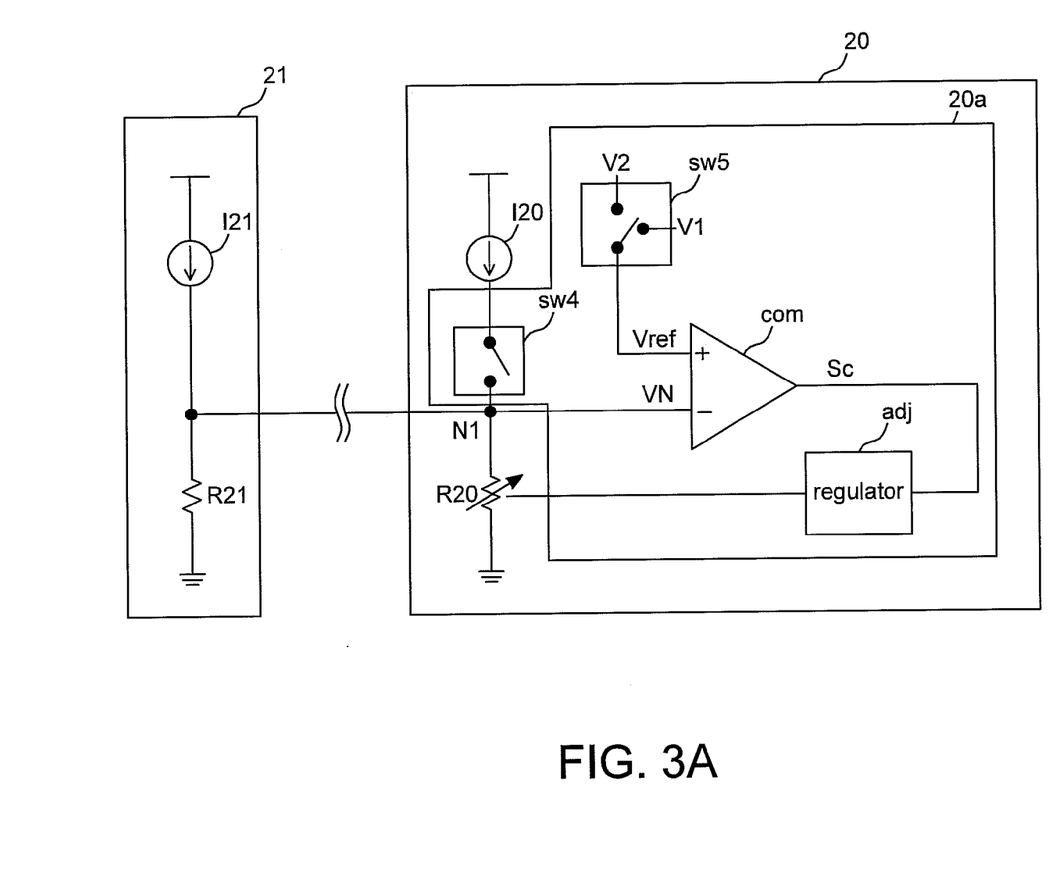
FIG. 3A shows a schematic diagram illustrating a part of circuitry of a universal serial bus device and the calibration circuit according to one embodiment of the invention.
Figure 3B:
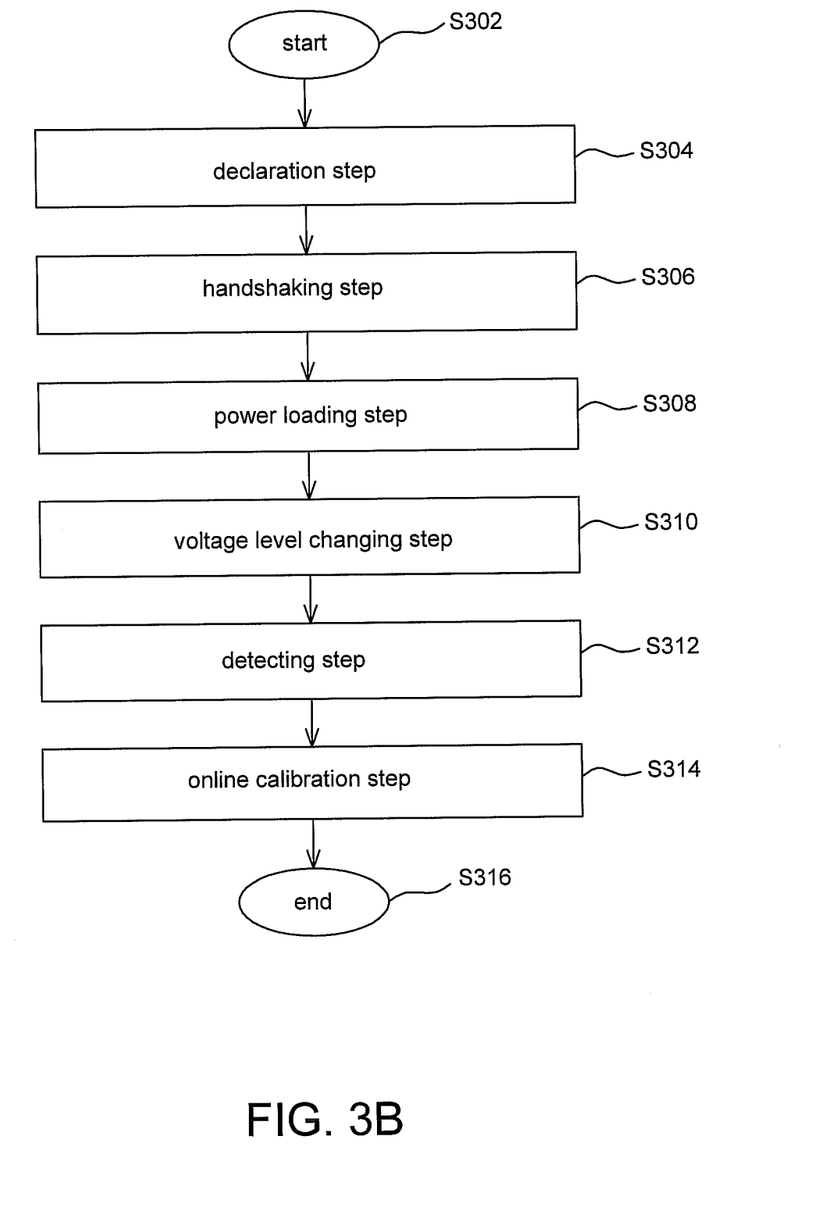
FIG. 3B shows a flow chart illustrating an online calibration method according to one embodiment of the invention.

The online calibration method provided by the invention can be executed at the USB host end 20. As shown in FIG. 3A, the USB host end 20 comprises a current source I20 of the USB host end, a terminal resistor R20, and a calibration circuit 20a. The calibration circuit 20a comprises a switch sw4, a switch sw5, a comparator com, and a regulator adj. The configuration is almost the same as the calibration circuit shown in FIG. 2B and details will not be given repeatedly. The flow chart of the calibration method of the USB host end 20 is shown in FIG. 3B and the timing diagram is referred to FIG. 1C. The calibration method comprises the following steps.

Step S302: start. The USB device end 21 is coupled to the USB host end 20 through a bus. At the time, the terminal resistor of the high speed transceiver of the USB device end 21 is coupled to the terminal resistor of the high speed transceiver of the USB host end 20 to form a node but no signal (voltage or current) is loaded on the two terminal resistors. The power of the USB device end 21 starts and internal reset is executed. The USB device end 21 and the USB host end 20 accomplish their self-calibration, the switch sw4 is turned on and the switch sw5 is switched to the self-calibration voltage V1. The comparator com compares the node voltage VN with the self-calibration voltage V1 and generates the comparison signal Sc according to the comparison result. The regulator adj adjusts the resistance of the terminal resistor R21 according to the comparison signal Sc until the node voltage VN is substantially equal to the self-calibration voltage V1 to accomplish self-calibration. At the time, the node voltage is $$VN = I20 * R20. \quad (3)$$

The USB host end 20 recognizes the connection of the USB device end 21 and then, it is preceded to step S304.

Step S304: declaration step, the USB device end 21 provides a declaration signal through the bus to notify the USB host end 20 that the USB device end 21 complies with the USB high speed specification.

Step S306: handshaking step, the USB host end 20 and the USB device end 21 start handshaking to output a plurality of chirp JK pairs.

Step S308: power loading step, the USB host end 20, before outputting a preset chirp JK pair, such as before outputting the chirp-K of the third chirp JK pair, loads a power on its terminal resistor R20 to generate a corresponding electric signal on the node connecting the terminal resistors R20 and R21.

Step S310: voltage level changing step, the voltage level of the chirp JK pair is changed.

Step S312: detecting step the USB host end 20 detects the changed chirp JK pair.

Step S314: online calibration step, the USB host end 20 processes online calibration according to the changed chirp JK pair to maintain the voltage level of the changed chirp JK pair within a preset range. Referring to FIG. 3A, the switch sw4 is turned on and the switch sw5 is switched to the online calibration voltage V2. At the time, the node voltage VN formed by the chirp JK pair on the node N1 is $$VN = I20 * \frac{R20 * R21}{R20 + R21}. \quad (4)$$

The comparator corn compares the node voltage VN with the online calibration voltage V2 to generate a comparison signal Sc. The regulator adj adjusts the resistance of the terminal resistor R21 according to the comparison signal Sc until the node voltage VN is substantially equal to the online calibration voltage V2. In other words, the voltage level of the changed chirp JK pair is maintained within the preset range.

Step S116: end. According to the specification, the USB host end 20 accomplishes handshaking with and recognition of the USB device end 21 and the USB device end 21 and the USB host end 20 start communication to perform data transmission.

According to the above operation, the USB host end 20 simultaneously calibrates the terminal resistors of the USB host end and the USB device end and thus the compatibility of the USB product can be increased and the problem in the prior art can be solved.

Figure 3C:
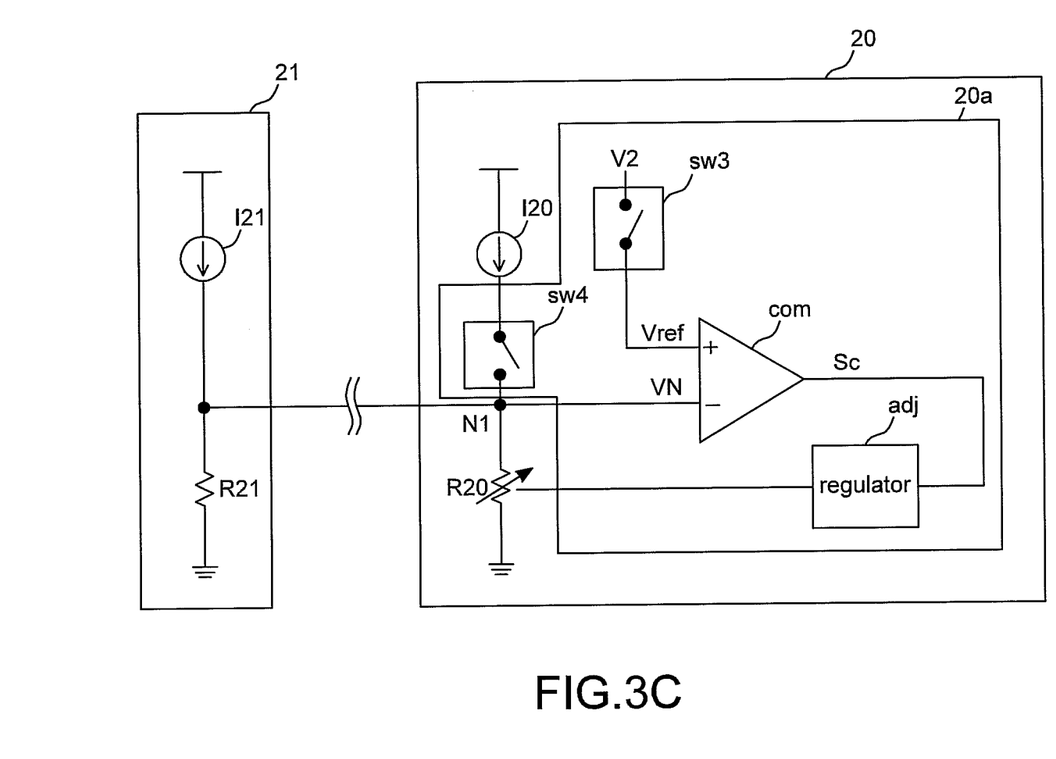
FIG. 3C shows a schematic diagram illustrating a part of circuitry of a universal serial bus device and the calibration circuit according to one embodiment of the invention.

It should be noted that the calibration circuit 20a of the USB host end 20 shown in FIG. 3C can also use only one switch sw3 to provide the online calibration voltage V2 to process only online calibration after the preset chirp JK pair is outputted to omit the conventional self-calibration operation.

Figure 4:
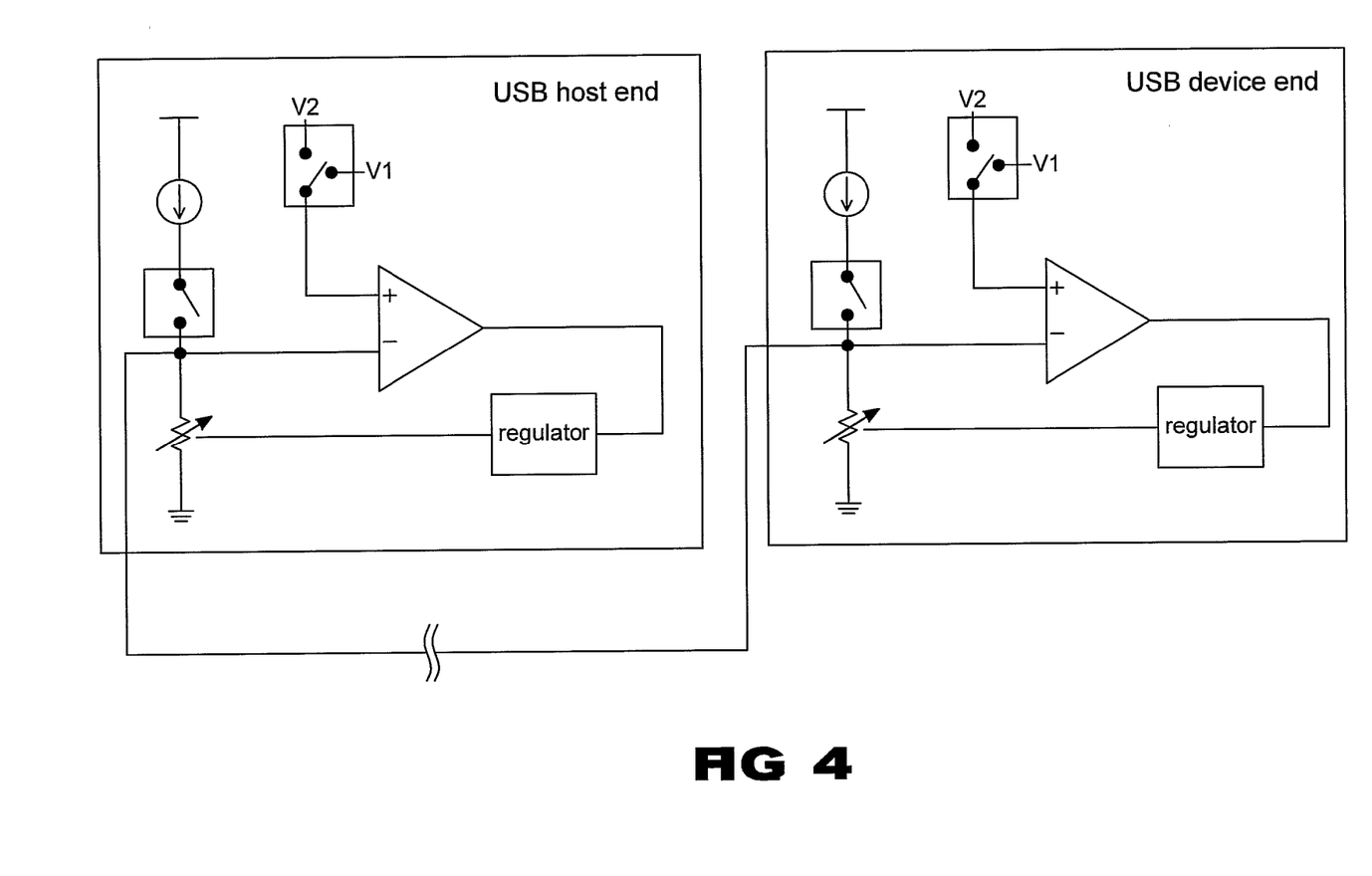
FIG. 4 shows a schematic diagram illustrating a part of circuitry of a universal serial bus device and the calibration circuit according to one embodiment of the invention.

Furthermore, in one embodiment, as shown in FIG. 4, the USB host end and the USB device end both are provided with calibration circuits. The two ends process the above online calibration of terminal resistors to further increase the compatibility between USB devices. According to the above description, those who are skilled in the art can understand the operation of the USB system shown in FIG. 4 and thus details will not be given hereinafter.

Figure 5:
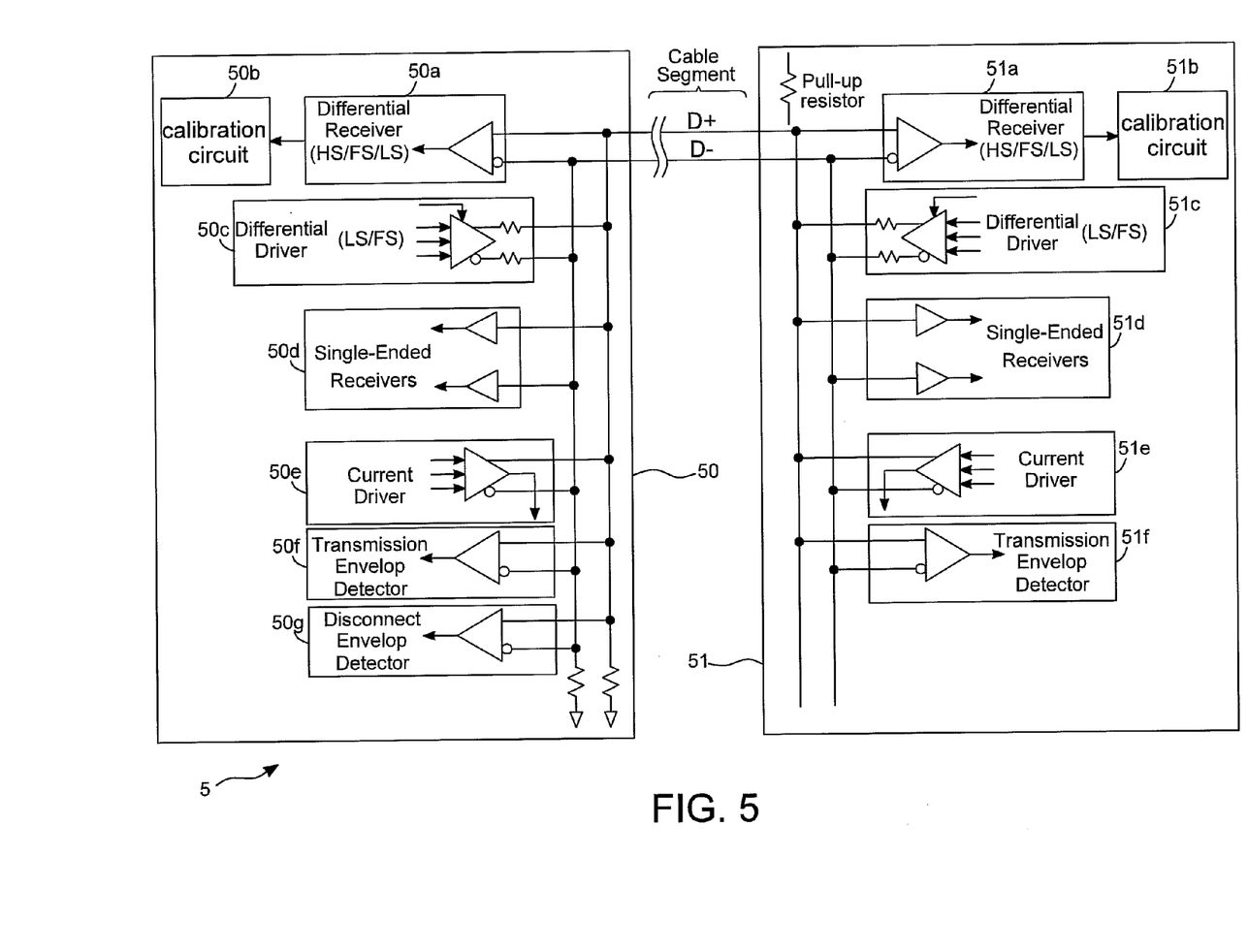
FIG. 5 shows a schematic diagram illustrating circuitry of a transceiver of a universal serial bus system according to one embodiment of the invention.

FIG. 5 shows a schematic diagram illustrating circuitry of a transceiver of the USB system 5 according to one embodiment of the invention. The cable segment is used to differentiate a USB host end and a USB device end. The left-hand side of the cable segment is the USB host end 50 and the right-hand side is the USB device end 51. The two devices both comprise differential receivers 50a and 51a, calibration circuits 50b and 51b, differential drivers 50c and 51c, single-ended receivers 50d and 51d, current drivers 50e and 51e, and transmission envelope detectors 50f and 51f. The USB host end 50 further comprises a disconnect envelope detector 50g. The calibration circuits 50b and 51b of the USB host end 50 and the USB device end 51, respectively, are implemented by the above mentioned calibration circuit. The differential receivers 50a and 51a are used to provide the above mentioned terminal resistors while the current driver 50e is used to provide the above mentioned power source (such as current source). According to the above description, those who are skilled in the art can understand the operation and calibration method of the circuit and thus details will not be given hereinafter. In one embodiment, the USB host end 50 and the USB device end 51 can be selectively provided with the calibration circuits 50b and 51b. For example, only one end of the USB host end 50 and the USB device end 51 is provided with the calibration circuit and the other end is not provided with the calibration circuit.

It should be noted that the coupling method of circuitry according to each embodiment of the invention is shown in each figure and the details of the circuitry in each figure will not be given hereinafter.

The online calibration method and the device or system having online calibration according to the present invention, after the terminal resistors of the USB host end and the device are coupled, compare the chirp JK pairs and the voltage on the node generated by coupling the two terminal resistors of the two ends with a reference voltage to adjust the termination impedance to have the node voltage substantially be equal to the reference voltage so as to reduce the probability of connection error, speed reduction, disconnection of the USB device and to achieve the purpose of increasing compatibility between USB devices Although the present invention has been fully described by the above embodiments, the embodiments should not constitute the limitation of the scope of the invention. Various modifications or changes can be made by those who are skilled in the art without deviating from the spirit of the invention. Any embodiment or claim of the present invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. A calibration method for a universal serial bus system including a universal serial bus (USB) host end and a USB device end, the method comprising:
   processing a self-calibration of the USB host end and the USB device end separately to calibrate terminal resistors of the USB host end and the USB device end;
   upon processing the self-calibration, performing the steps of:
   providing a plurality of chirp JK pairs;
   detecting the plurality of chirp JK pairs, and loading a power on a terminal resistor of the USB device end which is coupled to a terminal resistor of the USB host end before a preset chirp JK pair is outputted, so as to change a voltage level of the chirp JK pairs;
   detecting a voltage level variation of the changed chirp JK pairs on a node; and
   processing an online calibration according to the voltage level variation, so as to maintain the voltage level of the changed chirp JK pairs within a preset range.

2. The method according to claim 1, wherein the preset chirp JK pair starts after a chirp-K of the third chirp JK pair.

3. The method according to claim 1, wherein the step of online calibration comprises:
   comparing the voltage level of the changed chirp JK pair with a reference voltage to generate a comparison result; and
   adjusting the terminal resistor of the USB host end or the USB device end according to the comparison result.

4. The method according to claim 1, wherein the step of online calibration comprises:
   comparing the voltage level of the changed chirp JK pair with a reference voltage to generate a comparison result; and
   adjusting the terminal resistor of the USB host end and the terminal resistor of the USB device end according to the comparison result.

5. A calibration method for a universal serial bus (USB) device, coupled to another USB device, the method comprising:
   processing a self-calibration of the USB devices separately to calibrate terminal resistors of the USB devices; and
   upon processing the self-calibration, performing the steps of:
   during a first period of time after processing the self-calibration, loading a power on two terminal resistors included in the two universal serial bus devices to lower a voltage level of a chirp JK pair and apply a voltage level on a node between the two terminal resistors; and
   during a second period of time, comparing the voltage level with a reference voltage and processing an online calibration by adjusting the resistance values of the two terminal resistors or one of the two terminal resistors to maintain the lowered voltage level of the chirp JK pair within a preset range;
   wherein the second period of time is after the first period of time and the first period of time is after the universal serial bus accomplishes declaration of high speed capability and prior to a preset chirp JK pair being outputted.

6. The method according to claim 5, wherein the first period of time is before chirp-K of the third chirp JK pair is outputted.

7. A universal serial bus device, for connecting to another universal serial bus device and processing an online calibration, the device comprising:
   a power source;
   a terminal resistor; and
   a calibration circuit wherein the calibration circuit comprises:
   a first switch circuit, coupled between the power source and the terminal resistor, and used to provide the power source to the terminal resistor through a node;
   a second switch circuit, for providing a reference voltage;
   a comparator, comprising a first input end coupled to the reference voltage, a second input end coupled to the node, and an output end to output a comparison result; and
   a regulator, coupled to the output end of the comparator and adjusting a resistance value of the terminal resistor;
   wherein the first switch circuit is turned on during a first period to load the power source on the terminal resistor so as to lower a voltage level of a chirp JK pair and apply a voltage level on the node; the second switch circuit provides the reference voltage during a second period; the calibration circuit compares the voltage level on the node with the reference voltage to generate the comparison result; the regulator adjusts the resistance value of the terminal resistor according to the comparison result to maintain the lowered voltage level of the chirp JK pair within a preset range; the second period is after the first period; and the first period is after the universal serial bus accomplishes declaration of high speed capability, wherein the second switch circuit provides a self-calibration voltage before the first period to have the universal serial bus device process self-calibration.

8. The device according to claim 7, wherein the second switch circuit comprises:
   a first voltage source, providing an online calibration voltage;
   a second voltage source, providing a self-calibration voltage; and
   a switch element, switching between the first voltage source and the second voltage source to use either an online calibration voltage or a self-calibration voltage as the reference voltage to apply to the comparator.

9. The device according to claim 7, wherein the first period is before a preset chirp JK pair is outputted.

10. The device according to claim 9, wherein the preset chirp JK pair starts after a chirp-K of the third chirp JK pair.

* * * * *